United States Patent
Shapiro et al.

[11] 3,891,877
[45] June 24, 1975

[54] DIRECTLY LIQUID COOLED ROTOR WINDING FOR A NON-SALIENT POLE SYNCHRONOUS ELECTRIC MACHINE

[76] Inventors: Aron Beniaminovich Shapiro, Basseinaya ulitsa 53, kv. 70; Vladimir Pavlovich Chernyavsky, Pulkovskaya ulitsa 17, kv. 185; Ibragim Akhmedovich Kadi-Ogly, ulitsa Chaikovskoga 15, kv. 24; Jury Grigorievich Tjurin, V.O. 8 Linia 55, kv. 1, all of Leningrad, U.S.S.R.

[22] Filed: Apr. 16, 1973

[21] Appl. No.: 351,766

[52] U.S. Cl. ............................................. 310/61
[51] Int. Cl. ............................................. H02k 1/32
[58] Field of Search ............ 310/54, 52, 53, 58, 59, 310/61, 64, 65, 45, 71, 178, 198, 200, 201, 204, 205, 206, 261, 262, 264

[56] References Cited
UNITED STATES PATENTS

| | | |
|---|---|---|
| 3,075,104 | 1/1963 | Willyoung ............................ 310/61 |
| 3,249,775 | 5/1966 | Baylac ................................. 310/61 |
| 3,469,125 | 9/1969 | Rolf-Dieterkranz ................. 310/54 |
| 3,469,127 | 9/1969 | Eggemann ........................... 310/54 |
| 3,579,006 | 5/1971 | Kindl ................................... 310/54 |
| 3,622,820 | 11/1971 | Tjernstrom ......................... 310/54 |
| 3,652,882 | 3/1972 | Elliott .................................. 310/61 |
| 3,749,952 | 7/1973 | Lambrecht ........................... 310/54 |
| 3,753,015 | 8/1973 | Konovalov ........................... 310/64 |

*Primary Examiner*—R. Skudy

[57] ABSTRACT

A directly liquid cooled winding for the rotors of non-salient pole synchronous electric machines, wherein electric connections of the winding coils are effected with the help of auxiliary conductors which are directly cooled by the cooling liquid. The auxiliary conductors are arranged concentrically beneath the coil end portion of the rotor, the ends of the conductors extending axially beyond the coil end portion in the respective sectors of the upper and lower leads of the coils, and the conductors are connected with the leads either directly, or with the help of jumpers of solid cross-section.

3 Claims, 3 Drawing Figures

DIRECTLY LIQUID COOLED ROTOR WINDING FOR A NON-SALIENT POLE SYNCHRONOUS ELECTRIC MACHINE

The present invention relates to electric machines, and, more particularly, it relates to the windings of directly liquid cooled rotors for non-salient pole synchronous electric machines.

Known in the art is a directly liquid cooled rotor winding for a non-salient pole electric machines, wherein each pole includes a plurality of concentrically arranged, serially connected coils wound in a similar direction, with the leads of these coils being positioned axially to one side of the rotor, beyond the limits of its coil end in individual spaces where the electric and liquid communication connections are received.

It can be considered as a disadvantage of this known rotor winding structure, that therein there is a necessity of making the leads of the coils comparatively elongated and of positioning the connections of these leads, both electrical and liquid communication ones, within a separate individual space defined by auxiliary retaining rings and thrust rings disposed forwardly of the retaining members of the rotor winding proper.

All this leads to increased length of the rotor and to weakening of its shaft.

It is an object of the present invention to eliminate these disadvantages.

The main object of the present invention is to provide a multicoil rotor winding with such structure and arrangement of the leads of the coils and of the electrical connections thereof, which should provide for more simple and compact arrangement of the electrical and liquid communication connections to one side of the rotor and for ensuring free access to these connections for their assembling, control and repairs, and which should also provide for reducing the overall length of the rotor.

This object is accomplished in a rotor winding with direct liquid cooling for a synchronous non-salient pole electric machine, wherein each pole structure includes concentrically arranged coils connected electrically in series and hydraulically in parallel, said coils being wound in a similar direction, with the leads of said coils being positioned to the same side of said rotor and projecting beyond the coil end portions thereof, in which rotor structure, in accordance with the present invention, said electric connections of said coils include directly liquid cooled auxiliary conductors arranged concentrically beneath said coil end portion, the respective ends of said auxiliary conductors extending axially beyond the limits of said coil end portion, in the sectors of the respective upper and lower leads of said coils, said ends of said auxiliary conductors being connected with the respective ones of said leads of said coils either directly or by jumpers of solid cross section.

It is advisable for said leads of all said coils to extend coaxially with the respective adjoining conductors positioned in the slots provided in the body of said rotor.

It is further advisable for the inter-pole electrical connections of a double-pole rotor windings to be effected in the area of the axial portion of said coil end portion of said rotor, on the side thereof where said leads of said coils are positioned, with the help of at least two jumpers of solid cross-section, each one of said jumpers connecting the upper conductor adjoining the lead of the biggest coil of the respective one of said poles to the adjacent upper conductor of the biggest coil of the other one of said poles.

It is also expedient for the respective electrical and hydraulic connections of said leads of said coils to be positioned directly adjacent to said coil end portion of said rotor and to be retained against radial displacement by a retaining ring commonly serving said winding and said connections.

The hereinafter disclosed directly liquid cooled rotor winding, on account of having the directly liquid cooled jumpers thereof positioned under the coil end portion of the rotor, can have relatively short axial length of the coil end of the rotor on the side, where the electrical and hydraulic connections are disposed. Thus, the overall length of the rotor can be reduced, and the mounting and positioning of the electrical and hydraulic connections of the coils can be facilitated.

Besides, it becomes possible to have all the outgoing leads of the coils axially aligned with the respective adjoining main conductors of the winding extending within the slots in the rotor body, whereby the rotor assembling operation can be facilitated.

Moreover, all the hydraulic and electrical connections of the coils become easily accessible for their mounting, control and repairs.

The present invention will be better understood from the following detailed description of a practical embodiment thereof in a rotor winding structure, with reference made to the accompanying set of drawings, wherein.

Figure 1:
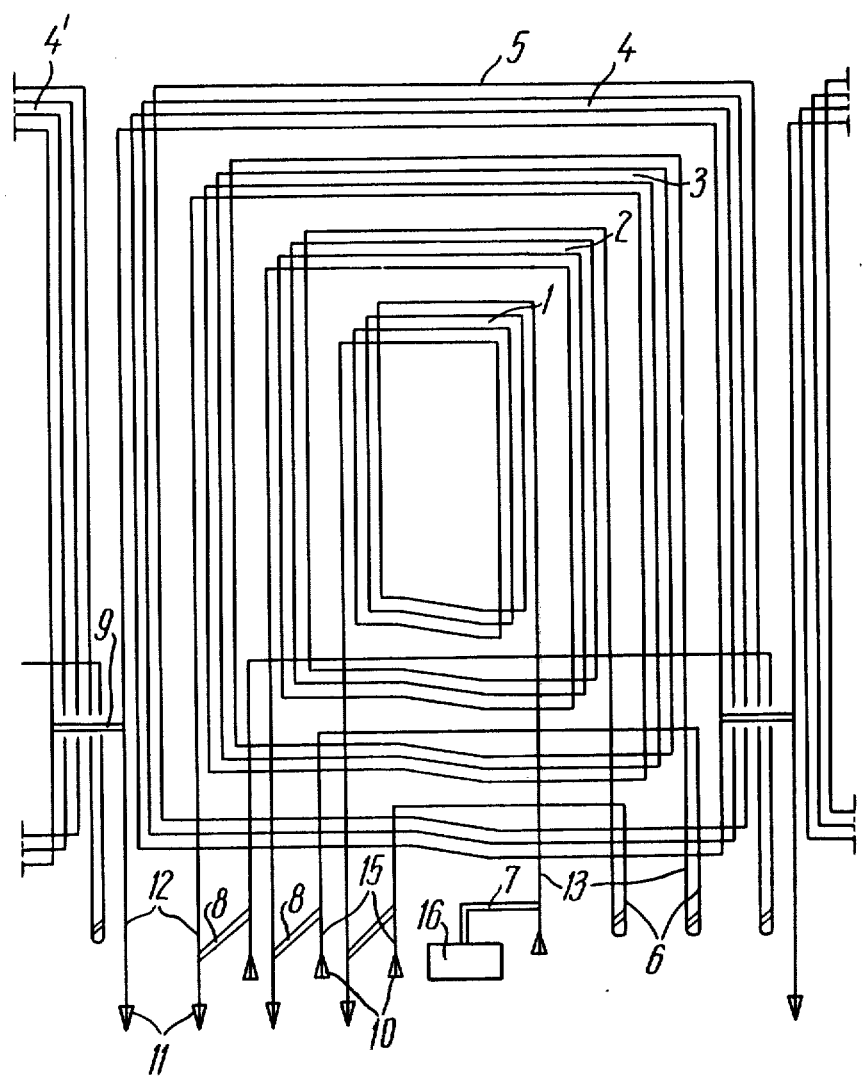
FIG. 1 shows a simplified electric circuit of a double-pole rotor winding, embodying the invention.

Referring now in particular to the appended drawings, the rotor winding includes four coils 1 to 4 (FIGS. 1, 2 and 3) for each rotor pole, the coils extending through the respective slots in the rotor body. Each one of the coils has four turns. In the winding diagram (FIG. 1) hollow conductors 5 and auxiliary conductors 6 are represented by solid single lines, the jumpers 7, 8 and 9 of solid cross-section are represented by two parallel lines, whereas the liquids inlets and outlets (10 and 11, respectively) are represented by arrows.

The upper leads 12 and the lower ones 13 extend axially from the slots 14 beyond the coil end of the rotor, coaxially with their respective conductors adjacent to the slots 14.

The coils 1 to 4 are electrically connected in series by the abovementioned auxiliary hollow conductors 6 which latter are bent arcuately and are positioned concentrically relative to one another under the coil end portion of the winding. The respective ends 15 of the auxiliary conductors 6 project axially beyond the limits of the coil end of the rotor, in the sectors of the respective outgoing leads of the coils, the ends 15 being connected with the respective leads by jumpers 8 of solid cross-section.

However, the ends of the auxiliary conductors may be connected directly with the respective leads of the coils, without the help of jumpers 8 of solid cross-section. Serial electric connection of the coils of each of the poles of the rotor is effected in the following manner. ONe lower lead of the smallest coil 1 is connected by jumpers 7 of solid cross-section to the collector ring 16 and serves as the outgoing lead of the rotor winding. The other, upper lead of the coil 1 is connected by the respective auxiliary conductor 6 with the lower lead of the coil 2 the upper lead of which is connected, also by means of the respective auxiliary conductor, with the lower lead of the coil 3. The upper lead of the coil 3 is connected by another auxiliary conductor with the lower lead of the biggest coil 4.

Inter-pole connection of the windings of the poles of the rotor is effected by means of a pair of jumpers 9 of solid cross-section positioned within the coil end portion of the rotor, adjacent to the outgoing leads of the coils.

Each one of these last-mentioned jumpers connects the upper conductor adjoining the lead of the biggest coil 4 of one of the rotor poles to the adjacent upper conductor of the biggest coil $4^1$ belonging to another pole.

The abovedescribed inter-pole connection is of a simple structure and provides for complete symmetry of the rotor, i.e., weight, thermal and magnetic one.

The insulations 17, 18 and 19 of the coil leads and of the auxiliary conductor are strengthened at the points of their intersection with conductors of other coils.

Turn-to-turn transitions of leads, as it is usually accepted, are disposed in the tangential portion of end portion.

Figure 2:
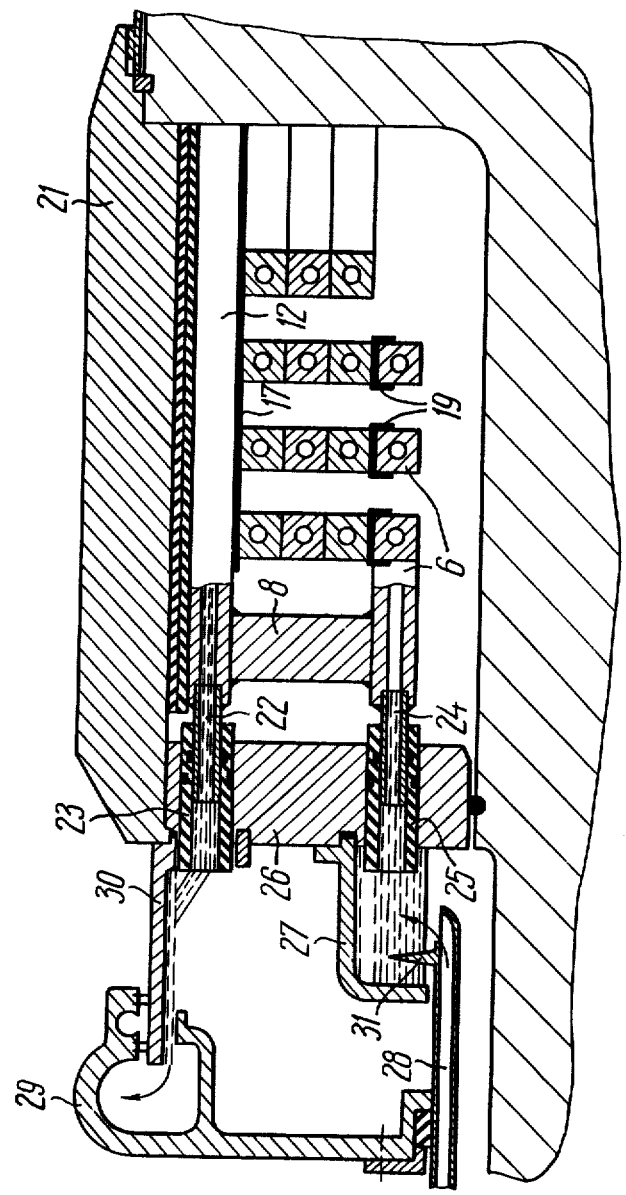
FIG. 2 is a longitudinal section of the coil end portion of a rotor, as viewed from the lower leads of coils in accordance with the invention.
Figure 3:
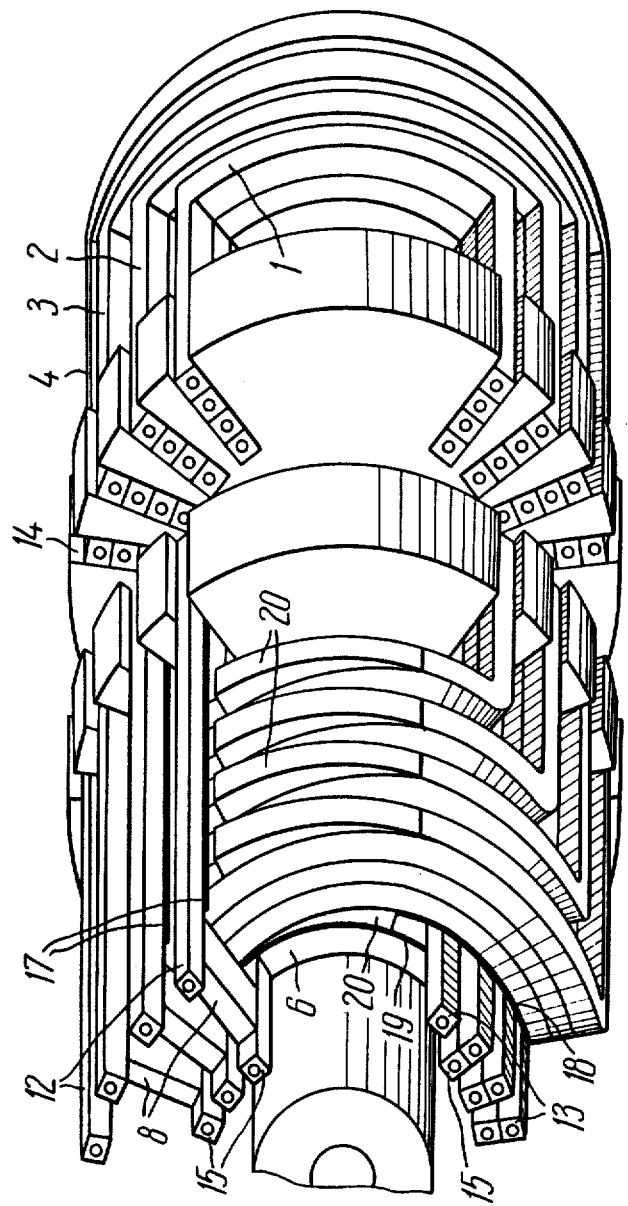
FIG. 3 shows a general view of a rotor winding, constructed in accordance with the invention.

The upper and the lower conductors of the coils in the areas where the successive turns of the coils are connected have attached thereto wedge members 20 (FIG. 3) which help to assure uniform bearing of the coil end portion against the retaining ring 21 (FIG. 2).

The respective upper leads 12 of the coils and one of the ends of each one of the auxiliary conductors 6 have connected thereto the respective ones of metal tubes 22 and 24 passing through tubes 23 and 25, respectively, made of electrically insulating material.

The opposite ends of the auxiliary conductors 6 are connected to the respective lower leads 13 of the coils both electrically and hydraulically, i.e., in a liquid-communicative manner.

The cooling liquid is supplied in an open stream into a hydraulic head collector defined by a thrust ring 26 and a profiled ring 27, the liquid being fed into this collector from ducts 28 provided in an annular member sealingly mounted in the body 29 of hydraulic supply line.

The liquid is picked-up, when the rotor is set in rotation, by the lower tubes 24 and 25, wherefrom centrifugal forces drive it through the auxiliary conductors 6 and through the hollow main conductors of the coils. Therefrom the liquid is discharged through the upper tubes 22 and 23 upon the internal surface of the drain ring 30 attached to the thrust ring 26 and flows along this surface into the body 29 of the hydraulic supply line.

The annular projection 31 seals the body 29 of the hydraulic supply line from the ambient air on the rotor shaft side.

The electric and hydraulic connections positioned adjacent to the coil end portion are retained against radial displacement by the retaining ring 21 which also retains the winding of the rotor; from axial displacement they are retained by the thrust ring 26, the two rings form a retainer unit having one fit and secured onto the rotor body.

Electric connection of the coils of a rotor, embodying the present invention, is applicable to rotor windings having any amount of poles, any number of coils in the winding of each pole and any quantity of turns in each coil.

The pole of such a rotor can have the leads of its winding constituted by any desired ones of the leads of the smallest and of the biggest coils thereof.

The general layout and the structure of a rotor winding constructed in accordance with the invention can be used in conjunction with a variety of cooling liquid supply systems, different from the one described hereinbefore, e.g., those wherein the cooling liquid is supplied and withdrawn through respective passages provided in the rotor shaft body; the invention can be also embodied in structures where the upper leads of the coils are directly electrically connected, without the help of jumpers, to auxiliary conductors, e.g., in structures where a single common end shoe with a single tube for discharge of the cooling liquid is employed.

Should such different cooling systems be employed, the direction of the flow of the cooling liquid may be different from the one indicated by the arrows in the appended drawings, FIGS. 1 and 2.

What we claim is:

1. A directly liquid cooled rotor winding for a synchronous electric machine having non-salient poles, comprising: windings of said poles of said rotor; concentrically arranged and wound in a similar direction coils included in said winding of each one of said poles; leads of said coils, positioned to one side of said rotor and projecting beyond the coil end portion of said rotor; directly liquid cooled auxiliary U-shaped conductors arranged concentrically to each other under said face end portion of said rotor, said auxiliary conductors electrically connecting said coils in serial relationship; ends of said auxiliary connectors extending axially beyond said coil end portion in the respective sectors of the upper and of the lower ones of said leads of said coils, said auxiliary conductors being electrically connected with the respective ones of said leads either directly or through jumpers of solid cross-section, interpole electric connections being effected in the area of the axial portion of said coil end portion of said rotor, on the side thereof where said coil leads are positioned, with the help of at least two jumpers of solid cross-section, each one of said jumpers connecting the upper conductor adjoining the lead of the biggest coil of the respective one of said poles to the adjacent upper conductor of the biggest coil of the other one of said poles.

2. A rotor winding in accordance with the claim 1, wherein said leads of all said coils are extending coaxially with the respective adjoining conductors positioned in the slots of said rotor.

3. A rotor winding in accordance with the claim 1, wherein the respective electric and hydraulic connections of said leads of said coils are positioned directly adjacent to said coil end portion of said rotor and are retained against radial displacement by a retaining ring common for said winding and said connections.

* * * * *